Patented Mar. 17, 1953

2,631,999

UNITED STATES PATENT OFFICE 2,631,999

ANION EXCHANGE RESINS FROM PRIMARY OR SECONDARY AMINES AND METHYL STYRENE POLYMERS

Elmer L. McMaster, Robert M. Wheaton, and James Russell Skidmore, Midland, Mich., assignors to The Dow Chemical Company, Midland, Mich., a corporation of Delaware No Drawing. Application December 29, 1948, Serial No. 68,062

16 Claims. (Cl. 260—88.1)

This invention concerns certain new anion exchange resins and a method of making the same. It pertains more particularly to the production of water-insoluble anion exchange resins from the benzene-insoluble copolymers of ar-alkyl-monovinyl-aromatic compounds with polyvinyl-aromatic compounds by halogenating the insoluble copolymers and reacting the halogenated polymeric vinyl-aromatic resins with ammonia and basic tervalent ammonia-type nitrogen-containing compounds, e. g. amines.

It is known to prepare anion exchange resins from polymers of divinylbenzene and copolymers of divinylbenzene with other polymerizable monovinyl-aromatic compounds, e. g. styrene, vinyl toluene, vinyl naphthalene, etc., by polymerizing divinylbenzene alone or in admixture with other polymerizable monovinyl-aromatic compounds, using known procedure, and thereafter nitrating the insoluble polymeric product in granular or finely divided form. The nitrated polymeric product is then reduced to the corresponding amino derivative by treatment with a reducing agent, e. g. nascent hydrogen. The polymeric products thus obtained contain amino groups directly attached to carbon atoms of the aromatic nuclei. Such products are capable of removing anions from aqueous solutions and are useful in water purification processes.

We have found that anion exchange resins having good ion exchange capacity, containing a basic nitrogen atom, e. g. of an amine group, attached to a carbon atom of an alkyl radical in the polymeric product, can be prepared by halogenating the solid copolymers of ar-alkyl-monovinyl-aromatic compounds with a polyvinyl-aromatic compound and reacting the halogenated polymeric vinyl-aromatic resins with ammonia or an ammonia-type nitrogen-containing compound.

The aminated products are solid resinous amines, or salts thereof. All of the products have an amine radical attached to an alkyl substituent on an aromatic nucleus of the polymer. More specifically, the products have an amine radical attached to a methyl substituent on an aromatic nucleus of the polymer, or attached to an alpha carbon atom of an alkyl substituent on an aromatic nucleus of the polymer, when the alkyl substituent contains two or more carbon atoms. The products are all insoluble in water and in dilute aqueous acid and dilute aqueous alkali solutions of 10 weight per cent concentration. They are also substantially insoluble at room temperature in organic solvents such as acetone, ethanol, benzene, ethylene dichloride, ortho-dichlorobenzene, tetrachloroethylene, beta,beta'-dichlorodiethyl ether, etc.

The aminated products are all useful as anion exchange resins. However, they vary widely in ion exchange capacity and in selectivity toward the absorption of various anions. One such resin may preferentially absorb a certain anion from a solution containing a given mixture of anions, whereas, another of the resins preferentially absorbs a different anion from such a solution.

In general, the ion exchange capacity depends upon the number of basic nitrogen atoms, i. e. amine groups, in the polymeric product. The number of such amine groups is, in turn, dependent upon the number of halomethyl radicals, or halo-alkyl radicals having a halogen atom attached to a carbon atom alpha to the aromatic nucleus in the halogenated polymeric vinyl-aromatic resin derivative, and upon the completeness with which the halogen atoms of the halomethyl or halo-alkyl radicals are replaced by ammonia-type nitrogen atoms. The selectivity for different anions, depends, for the most part, upon the particular ammonia-type nitrogen-containing compound employed as a reactant in forming the anion exchange resin. The invention permits the production, from a single copolymer, of a series of anion exchange resins having different ion exchange capacities and selectivity for different anions.

The vinyl-aromatic resins subjected to the halogenating reaction are preferably copolymers of divinylbenzene with ar-alkyl-monovinyl-aromatic compounds of the benzene and naphthalene series, i. e. having not more than 10 carbon atoms in the aromatic nucleus, which ar-alkyl-monovinyl-aromatic compounds contain, in addition to the vinyl radical, one or more, preferably from one to three, nuclear substituents consisting of lower alkyl radicals, other than a tertiary alkyl radical, containing not more than four carbon atoms. Examples of such ar-alkyl-monovinyl-aromatic compounds are ar-methylstyrene, ar-dimethylstyrene, ar-ethylstyrene, ar-methyl vinylnaphthalene, ar-sec.-butylstyrene, ar-tri-methylstyrene, ar-dimethyl vinylnaphthalene, ar-diethylstyrene, etc.

In a preferred embodiment of the invention the copolymers are prepared from divinylbenzene and ar - alkyl - monovinyl - aromatic compounds which contain, in addition to the vinyl radical, from one to three methyl radicals as nuclear substituents. The copolymers are solid higher polymeric vinyl-aromatic resins, e. g. having molecular weights of 50,000 or above, and may contain 50 per cent by weight or less of a polyvinyl-aromatic compound such as divinylbenzene, divinyl toluene, divinyl xylene, divinyl naphthalene, divinyl-ethylbenzene, etc., chemically combined, i. e. interpolymerized, with the ar-alkyl-monovinyl-aromatic compounds just mentioned. The copolymers preferably contain from 0.5 to 40 parts by weight of a polyvinyl-aromatic compound, e. g. divinylbenzene, and from 99.5 to 60 parts of an ar-alkyl-monovinyl-aromatic compound. The copolymers may have inert fillers such as diatomaceous earth, finely shredded asbestos, or powdered glass, etc., incorporated therewith to increase the porosity and effective surface of the same.

The copolymers may be prepared by any suitable method heretofore employed for the polymerization of vinyl type monomeric compounds. For instance, a mixture containing divinylbenzene and an ar-alkyl-monovinyl-aromatic compound, e. g. ar-dimethylstyrene, may be polymerized in mass or in the presence of a dispersion medium for the monomers by the use of heat, light, or heat and light in the presence or absence of a polymerization catalyst at atmospheric, subatmospheric, or superatmospheric pressure.

Suitable catalysts for effecting polymerization of the monomers are the peroxides, e. g. benzoyl peroxide, acetylbenzoyl peroxide, lauroyl peroxide, hydrogen peroxide, etc. Per-compounds such as potassium persulfate, sodium perborate, ammonium persulfate or the like may also be employed as polymerization catalysts.

The polymerization is preferably carried out in aqueous dispersion at temperatures between 80° and 100° C., employing a peroxide, e. g. benzoyl peroxide, as the polymerization catalyst, although other polymerization temperatures and catalysts may be used. Usually a protective colloid such as sodium cellulose glycolate, methylcellulose, or the like, is added to the aqueous dispersion so as to obtain the polymeric product in granular or bead form.

The copolymer is separated from the aqueous dispersion by usual methods, e. g. filtering, centrifuging, etc., washed with water and dried by heating in a current of hot air or by other usual manner. The polymeric product may be broken, ground, crushed or otherwise reduced to a granular or powdered form or it may be used in the form of beads.

Halogenated derivatives of the copolymers, containing halo-alkyl radicals attached to aromatic nuclei in the polymeric vinyl-aromatic resins may be prepared by reacting the copolymers, at temperatures between —10° and 150° C., with chlorine or bromine, in the presence of a halogenation catalyst such as phosphorus, phosphorus trichloride, ultraviolet light, or a combination of phosphorus trichloride and light, etc., promoting substitution of halogen for hydrogen attached to carbon atoms of the alkyl radicals on the aromatic nuclei, while the copolymer is dispersed in and swollen by an organic liquid such as carbon tetrachloride, benzene, monochlorobenzene, ortho-dichlorobenzene, acetic acid, tetrachloroethylene, pentachloroethane, etc., which organic liquid is less reactive with the chlorine or bromine than is the copolymer.

The halogenation reaction is preferably carried out at atmospheric pressure or under a slight superatmospheric pressure, e. g. of from 2 to 5 pounds per square inch gauge, at temperatures between 50° and 80° C., employing carbon tetrachloride as the dispersing medium. Halogenation is continued until one halogen atom is substituted for a hydrogen atom in methyl radicals of the polymer and preferably until one halogen atom is substituted for a hydrogen atom in each of such methyl radicals. Such substituent halogen is relatively reactive with ammonia and ammonia-type nitrogen-containing compounds, e. g. amines, as compared to nuclear-substituted halogen or halogen substituted in the ploymer chain and is herein referred to as reactive halogen.

The halogenation reaction to introduce a chlorine or bromine atom into an alkyl radical in the copolymer, is usually accompanied, at least to some extent, by substitution of halogen atoms on aromatic nuclei of the copolymer and also by substitution of halogen atoms in the polymer chain. Substitution of more than one halogen atom on the same methyl radical or substitution of halogen for a hydrogen atom attached to a carbon atom of a polymer chain, forms halogenated polymeric derivatives which are not readily reactive with ammonia or amines to produce a product having ion exchange capacity. Chlorine or bromine substituted for hydrogen attached to a carbon atom of an aromatic nucleus is also non-reactive with ammonia-type nitrogen-containing compounds, although such nuclear substitution of halogen, insofar as we are aware, has no adverse effect on the resin. On the contrary, some nuclear halogenation appears to be an advantage by increasing the density of the polymeric product, per unit of volume. The heavier resin particles are not as readily swept from a bed of the resin by upflow of liquid, when employed in usual ion exchange processes.

The granular resin is usually reacted with from 0.5 to 2.0, preferably from 0.5 to 1.5, molecular proportions of chlorine or bromine for each substituent methyl radical in the aromatic nucleus of the structural unit, based on a molecular equivalent weight of the polymeric product. No exact proportions can be stated since the proportion of halogen reacted with the copolymer may vary, depending upon the number of methyl radicals attached to an aromatic nucleus, the proportion of halogen reacted with the methyl radicals, and on other factors, such as the amount of halogen introduced into the aromatic nuclei or introduced into the polymer chain. Halogenation is continued, in most instances, until the resin forms a product having maximum ion exchange capacity when reacted with an amine. This can readily be determined by withdrawing a sample of the halogenated granular resin from the vessel during the course of the halogenating reaction, washing the resin with water, heating the resin with an amine, e. g. ethylenediamine, in aqueous solution at temperatures between 70° and 100° C. for 30 minutes, thereafter converting the aminated resin to its bicarbonate form by washing with an aqueous sodium bicarbonate solution, rinsing the resin free of bicarbonate solution with water, dispersing a known volume of the resin in an aqueous sodium chloride solution and titrating the solution with N/1 HCl solution to a pH of 4. Halogenation of the resin is stopped when such test shows that it forms a product having a satisfactory ion exchange capacity. For most copolymers the proportion of halogen to be used is within the limits stated.

The granular halogenated resin is separated from the organic liquid, used as a dispersing medium, by usual methods such as filtering, centrifuging, decanting or the like and washed with water. The resin is preferably washed with a water-soluble organic solvent, e. g. acetone, ethyl alcohol or methanol, to remove residual traces of the dispersing liquid and then washed with water. The washed halogenated resin may be dried in a current of air at low temperature, i. e. below 50° C., but such drying is not essential prior to reacting it with ammonia or an ammonia-type nitrogen-containing compound, e. g. a primary or secondary amine.

The halogenated resin is mixed with ammonia or an ammonia-type nitrogen-containing compound, having at least one valence of each nitrogen atom attached to hydrogen, and the mixture is preferably heated to cause reaction between the ammonia-type nitrogen atom and a substituent reactive halogen atom attached to a methyl radical, i. e. a halomethyl radical, in the polymeric reactant. Heating of the mixture is continued until at least a portion, preferably each, of the reactive halogen atoms attached to carbon of a methyl radical in the polymeric reactant is replaced by an ammonia-type nitrogen atom, e. g. to form an amine halide.

The ammonia-type nitrogen-containing reactants should contain a basic tervalent nitrogen atom whose valences are attached only to hydrogen or to hydrogen and carbon. The tervalent nitrogen may have attached thereto all hydrogen atoms or a combination of hydrogen and carbon atoms as is the case when ammonia or a primary or a secondary amine, e. g. ethylamine or dimethylamine, are used. The tervalent nitrogen may also be present in organic compounds containing two, or more than two, tervalent nitrogen atoms in the same molecule, e. g. ethylenediamine, propylenediamine, diethylenetriamine, etc. In any instance, each tervalent nitrogen atom should have at least one valence attached to hydrogen. Examples of such ammonia-type nitrogen-containing compounds are methylamine, ethylamine, propylamine, butylamine, hexylamine, octylamine, diethylamine, dibutylamine, benzylamine, methylethanolamine, ethylisopropanolamine, cyclohexylamine, propylenediamine, amylethylamine, butylethanolamine, ethanolamine, aniline, ethyl aniline, methylethylamine, ethylenediamine, diethylenetriamine, and triethylenetetramine. Mixtures of any two or more of such amines may also be employed.

The proportion of ammonia or ammonia-type nitrogen-containing compound employed, relative to the halogenated polymer reactant, should be such that there is present in the reaction mixture at least one ammonia-type nitrogen atom, having one valence attached to hydrogen, for each reactive halogen atom attached to carbon of a methyl radical, i. e. halomethyl radical, in the polymer reactant. The ammonia or amine may be used in excess over the minimum proportion just stated. Usually from one to three molecular proportions of ammonia or amine are used per halomethyl radical in the polymeric reactant employed, although greater amounts may be used.

The reaction between the halogenated copolymer and the ammonia-type nitrogen-containing compound may be carried out at atmospheric, subatmospheric or superatmospheric pressure and at temperatures between 25° and 150° C., in the presence or absence of a dispersing medium. The reaction is preferably carried out at temperatures between 25° and 100° C., in the presence of a dispersing medium such as water, ethanol, acetone or the like, that is a solvent for the ammonia-type nitrogen-containing compound employed. A large excess of the ammonia or amine may be used in which case no other dispersing medium need be employed. When employing water-soluble amines that are not readily volatilized at a reaction temperature of 100° C., the reaction is preferably carried out in aqueous medium employing the amine in concentration of 20 to 50 per cent by weight, based on the combined weight of the same and the water, and the mixture is heated to reflux. The reaction is substantially complete in from 2 to 6 hours at reflux temperature.

The aminated resin is isolated, e. g. by filtering the reaction mixture, and washed with water. The resin may be converted to its basic form by washing with an aqueous alkali solution, e. g. sodium hydroxide, sodium bicarbonate or potassium carbonate.

The following examples illustrate ways in which the invention has been practiced but are not to be construed as limiting the scope thereof.

Example 1

To 1747 parts by weight of a benzene-insoluble granular copolymer, containing in chemically combined form 90 parts by weight dimethylstyrene, 6 parts ethylvinylbenzene and 4 parts divinylbenzene, there was added 8400 parts of carbon tetrachloride and 17.5 parts of phosphorus trichloride as chlorination catalyst. The mixture was stirred in a glass vessel and chlorine passed through the dispersion at a temperature between 62° and 72° C., while exposing the reaction mixture to rays from an ultraviolet lamp placed to one side of the reaction vessel. A total of 1461 parts of chlorine was fed to the reaction vessel over a period of 48.7 hours. The granular resin was separated from the reaction mixture by filtering, washed with water and dried at room temperature. Analysis of the dried resin showed it to contain 37.50 per cent by weight side chain chlorine and 10.71 per cent nuclear chlorine. Five parts by volume of the granular chlorinated polymer, 5 parts by volume of liquid ammonia and 5 parts by volume of acetone, were sealed in a glass tube and heated at a temperature of 70° C. for 20 hours. The aminated resin was removed from the cooled tube, isolated by filtering, washed with water and tested for ion exchange capacity. It had an anion exchange capacity equivalent to 30,400 grains of calcium carbonate per cubic foot of resin bed.

Example 2

Five parts by volume of the granular chlorinated resin of Example 1 was added to 10 parts by volume of water and 10 parts by volume of ethylenediamine. The mixture was sealed in a pressure bottle and heated at a temperature of 70° C. for 16 hours. After cooling the bottle, the resin was isolated by filtering, washed with water and tested for ion exchange capacity. It had an anion exchange capacity equivalent to 43,600 grains of calcium carbonate per cubic foot of resin bed.

Example 3

By procedure similar to that described in Example 2, five parts by volume of the granular chlorinated resin of Example 1 was reacted with 10 parts by volume of dimethylethanolamine in admixture with 10 parts of water. The aminated resin had an anion exchange capacity equivalent

Example 4

Sixty-one parts by weight of a granular copolymer, containing in chemically combined form 90 parts by weight dimethylstyrene, 6 parts ethylvinylbenzene and 4 parts divinylbenzene, was placed in a glass reaction vessel and 200 parts of ortho-dichlorobenzene and 0.6 part of phosphorus trichloride added thereto as dispersing medium and chlorination catalyst, respectively. The mixture was stirred and heated to a temperature between 105° and 140° C. Chlorine was passed into the liquid for a period of 5 hours, at an average rate of 60 parts of chlorine per hour, while exposing the reaction mixture to rays from an ultraviolet lamp placed to one side of the reaction vessel. The reaction mixture was cooled and the chlorinated resin granules separated by filtering, washed with acetone, then washed with water and dried at room temperature. Analysis of the resin showed it to contain 38.6 per cent by weight of side chain chlorine and 11.09 per cent nuclear chlorine. Five parts by volume of the granular chlorinated resin, 10 parts by volume of ethylenediamine and 10 parts by volume of water, were placed in a reaction flask and heated at a reflux temperature for 4 hours. The aminated resin was separated from the reaction mixture by filtering, washed with water and tested for ion exchange capacity. It had an anion exchange capacity equivalent to 21,600 grains of calcium carbonate per cubic foot of resin bed.

Example 5

Sixty-three parts by weight of a granular copolymer, containing in chemically combined form 50 parts by weight dimethylstyrene, 30 parts ethylvinylbenzene and 20 parts divinylbenzene, was placed in a glass reaction vessel and dispersed in 319 parts of carbon tetrachloride and 0.6 part of phosphorous trichloride added thereto as chlorination catalyst. Chlorine was passed through the dispersion at a temperature between 68° and 74° C., at an average rate of 0.7 part per minute, for 630 minutes while exposing the reaction mixture to rays from an ultraviolet lamp placed to one side of the reaction vessel. The resin was separated from the liquid by filtering, washed with water and dried in air at room temperature. Analysis of the chlorinated resin showed it to contain 29.89 per cent by weight side chain chlorine and 14.10 per cent by weight nuclear chlorine. A mixture consisting of 3 parts by volume of the granular chlorinated resin, 10 parts by volume of diethylamine and 10 parts by volume of water, was sealed in a pressure bottle and heated at a temperature of 70° C. for 20 hours. The aminated resin was isolated by filtering, washed with water and tested for ion exchange capacity. It had an anion exchange capacity equivalent to 12,120 grains of calcium carbonate per cubic foot of resin bed.

Example 6

To 3 parts by volume of the granular chlorinated resin of Example 5, there was added 10 parts by volume of n-butylamine and 10 parts by volume of water. The mixture was sealed in a pressure bottle and heated at a temperature of 70° C. for 20 hours. The aminated resin was isolated by filtering, washed with water and tested for ion exchange capacity. It had an anion exchange capacity equivalent to 7440 grains of calcium carbonate per cubic foot of resin bed.

Example 7

Fifty-seven parts by weight of a granular copolymer, containing in chemically combined form 98.75 parts by weight dimethylstyrene, 0.75 part ethylvinylbenzene and 0.5 part divinylbenzene, was dispersed in 319 parts of carbon tetrachloride, in a glass reaction vessel, and 0.6 part of phosphorus trichloride added thereto as chlorination catalyst. The mixture was heated to a temperature of 60° C., and a total of 487 parts of chlorine fed into the dispersion at an average rate of 30 parts per hour, while exposing the mixture to rays from an ultraviolet lamp placed to one side of the reaction vessel. The resin was separated from the reaction mixture by filtering, washed with water and dried at room temperature. Analysis of the chlorinated resin showed it to contain 43.50 per cent by weight side chain chlorine and 13.10 per cent by weight nuclear chlorine. Three parts by volume of the chlorinated copolymer, 10 parts by volume of diethylamine and 10 parts by volume of water, were sealed in a pressure bottle and heated at a temperature of 70° C. for 20 hours. After cooling the bottle, the aminated resin was isolated by filtering, washed with water and tested for ion exchange capacity. It had an anion exchange capacity equivalent to 29,800 grains of calcium carbonate per cubic foot of resin bed.

Example 8

Three parts by volume of the granular chlorinated copolymer of Example 7 was reacted with 10 parts by volume of n-butylamine in admixture with 10 parts of water, by procedure described in the preceding example. The resin had an anion exchange capacity equivalent to 18,600 grains of calcium carbonate per cubic foot of resin bed.

Other modes of applying the principle of our invention may be employed instead of those explained, change being made as regards the method or products herein disclosed, provided the steps or products stated in any of the following claims or the equivalent of such stated steps or compounds be employed.

We therefore particularly point out and distinctly claim as our invention:

1. A method of making an anion exchange resin which comprises reacting, at temperatures between 25° and 100° C. a solid halogenated benzene-insoluble copolymer, containing in chemically combined form from 0.5 to 40 parts by weight of a polyvinyl-aromatic hydrocarbon and from 99.5 to 60 parts of an ar-alkyl-monovinyl-aromatic hydrocarbon having the vinyl radical and from 1 to 3 methyl radicals as nuclear substituents, said halogenated copolymer having a reactive substituent halogen atom attached to each of at least a portion of the methyl radicals, with a nitrogen-containing base selected from the group consisting of ammonia and primary and secondary amines, in amount such that at least one trivalent nitrogen atom having at least one hydrogen atom attached thereto is present in the reaction mixture for each reactive substituent halogen atom attached to carbon of a methyl radical in the polymeric reactant.

2. A method of making an anion exchange resin which comprises reacting, at temperatures between 25° and 100° C., a solid chlorinated benzene-insoluble copolymer containing in chemically combined form from 0.5 to 40 parts by weight of a polyvinyl-aromatic hydrocarbon and from 99.5 to 60 parts of an ar-alkyl-monovinylaromatic hydrocarbon having the vinyl radical and from 1 to 3 methyl radicals as nuclear substituents, said chlorinated copolymer having a reactive substituent chlorine atom attached to each of at least a portion of the methyl radicals, with a nitrogen-containing base selected from the group consisting of ammonia and primary and secondary amines, in amount such that at least one trivalent nitrogen atom having at least one hydrogen atom attached thereto is present in the reaction mixture for each reactive substituent chlorine atom attached to carbon of a methyl radical in the polymeric reactant.

3. A method of making an anion exchange resin which comprises reacting, at temperatures between 25° and 100° C., a solid brominated benzene-insoluble copolymer, containing in chemically combined form from 0.5 to 40 parts by weight of a polyvinyl-aromatic hydrocarbon and from 99.5 to 60 parts of an ar-alkyl-monovinyl-aromatic hydrocarbon having the vinyl radical and from 1 to 3 methyl radicals as nuclear substituents, said brominated copolymer having a reactive substituent bromine atom attached to each of at least a portion of the methyl radicals, with a nitrogen-containing base selected from the group consisting of ammonia and primary and secondary amines, in amount such that at least one trivalent nitrogen atom having at least one hydrogen atom attached thereto is present in the reaction mixture for each reactive substituent bromine atom attached to carbon of a methyl radical in the polymeric reactant.

4. A method of making an anion exchange resin which comprises reacting, at temperatures between 25° and 100° C., a solid chlorinated copolymer of from 0.5 to 40 parts by weight divinylbenzene and from 99.5 to 60 parts dimethylstyrene, said chlorinated copolymer having a reactive substituent chlorine atom attached to a carbon atom of at least a portion of the methyl radicals, with a nitrogen-containing base selected from the group consisting of ammonia and primary and secondary amines, in amount such that at least one trivalent nitrogen atom having at least one hydrogen atom attached thereto is present in the reaction mixture for each reactive substituent chlorine atom attached to carbon of a methyl radical in the polymeric reactant.

5. In a method of making an anion exchange resin, the steps of chlorinating a solid benzene-insoluble copolymer, containing in chemically combined form from 0.5 to 40 parts by weight of a polyvinyl-aromatic hydrocarbon and from 99.5 to 60 parts of an ar-alkyl-monovinyl-aromatic hydrocarbon having the vinyl radical and from 1 to 3 methyl radicals as nuclear substituents, by dispersing granules of the insoluble copolymer in an organic liquid, capable of swelling polystyrene, and reacting the polymeric vinyl-aromatic resin, at temperatures between −10° and 150° C. with chlorine in the presence of a catalyst promoting substitution of chlorine in the alkyl radicals, to obtain a chlorinated polymeric derivative having a reactive chlorine atom substituted for a hydrogen atom in at least a portion of the methyl radicals, and reacting the chlorinated polymeric derivative at temperatures between 25° and 100° C. with a nitrogen-containing base selected from the group consisting of ammonia and primary and secondary amines, in amount such that at least one trivalent nitrogen atom having at least one hydrogen atom attached thereto is present in the reaction mixture for each reactive substituent chlorine atom attached to carbon of a methyl radical in the polymeric reactant.

6. In a method of making an anion exchange resin, the steps of chlorinating a solid benzene-insoluble copolymer, containing in chemically combined form from 0.5 to 40 parts by weight divinylbenzene and from 99.5 to 60 parts dimethylstyrene, by dispersing granules of the insoluble copolymer in an organic liquid capable of swelling the same and reacting the copolymer with chlorine at temperatures between −10° and 150° C., in the presence of a catalyst promoting substitution of chlorine in the alkyl radicals, to obtain a chlorinated polymeric derivative having a reactive chlorine atom substituted for a hydrogen atom in at least a portion of the methyl radicals, and reacting the chlorinated polymeric derivative with a nitrogen-containing base selected from the group consisting of ammonia and primary and secondary amines, in amount such that at least one trivalent nitrogen atom having at least one hydrogen atom attached thereto is present in the reaction mixture for each reactive substituent chlorine attached to carbon of a methyl radical in the polymeric reactant.

7. A water-insoluble reaction product of a halogenated benzene-insoluble solid copolymer, containing in chemically combined form from 0.5 to 40 parts by weight of a polyvinyl-aromatic hydrocarbon and from 99.5 to 60 parts by weight of an ar-alkyl-monovinyl-aromatic hydrocarbon having the vinyl radical and from 1 to 3 methyl radicals as nuclear substituents, which halogenated copolymer contains substantial nuclear halogenation and has a reactive halogen atom substituted for a hydrogen atom in at least a portion of the methyl radicals, with a nitrogen-containing base selected from the group consisting of ammonia and primary and secondary amines, in amount such that substantially each reactive substituent halogen atom attached to carbon of a methyl radical in the halogenated copolymer is replaced by a nitrogen atom.

8. The water-insoluble reaction product of a chlorinated benzene-insoluble solid copolymer, containing in chemically combined form from 0.5 to 40 parts by weight of a polyvinyl-aromatic hydrocarbon and from 99.5 to 60 parts of an ar-alkyl-monovinyl-aromatic hydrocarbon having the vinyl radical and from 1 to 3 methyl radicals as nuclear substituents, which chlorinated copolymer contains substantial nuclear chlorination and has a reactive chlorine atom substituted for a hydrogen atom in at least a portion of the methyl radicals, with a nitrogen-containing base selected from the group consisting of ammonia and primary and secondary amines, in amount such that substantially each reactive substituent chlorine atom attached to carbon of a methyl radical in the chlorinated copolymer is replaced by a nitrogen atom.

9. The reaction product of a chlorinated benzene-insoluble copolymer of from 0.5 to 40 parts by weight divinylbenzene and from 99.5 to 60 parts of dimethylstyrene, which chlorinated copolymer contains substantial nuclear chlorination and has a reactive chlorine atom substituted for a hydrogen atom in at least a portion of the methyl radicals, with a nitrogen-containing base selected from the group consisting of ammonia and primary and secondary amines, in amount such that substantially each reactive substituent chlorine atom attached to carbon of a methyl radical in the chlorinated copolymer is replaced by a nitrogen atom.

10. The reaction product of a chlorinated benzene-insoluble copolymer of from 0.5 to 40 parts by weight divinylbenzene and from 99.5 to 60 parts methylstyrene, which chlorinated copolymer contains substantial nuclear chlorination and has a reactive substituent chlorine atom attached to at least a portion of the methyl radicals, with a nitrogen-containing base selected from the group consisting of ammonia and primary and secondary amines, in amount such that substantially each reactive substituent chlorine atom attached to carbon of a methyl radical in the chlorinated copolymer is replaced by a nitrogen atom.

11. The reaction product of a chlorinated benzene-insoluble copolymer of from 0.5 to 40 parts by weight divinylbenzene and from 99.5 to 60 parts ar-methyl-vinyl-naphthalene, which chlorinated copolymer contains substantial nuclear chlorination and has a reactive substituent chlorine atom attached to at least a portion of the methyl radicals, with a nitrogen-containing base selected from the group consisting of ammonia and primary and secondary amines, in amount such that substantially each reactive substituent chlorine atom attached to carbon of a methyl radical in the chlorinated copolymer is replaced by a nitrogen atom.

12. The reaction product of a chlorinated benzene-insoluble copolymer, containing in chemically combined form from 0.5 to 40 parts by weight of divinylbenzene and from 99.5 to 40 parts of ar-dimethylstyrene, which chlorinated copolymer contains substantial nuclear chlorination and has a reactive chlorine atom substituted for a hydrogen atom in each of at least a portion of the methyl radicals, with ethylenediamine in amount such that substantially each reactive substituent chlorine atom attached to carbon of a methyl radical in the chlorinated copolymer is replaced by a nitrogen atom of the ethylenediamine.

13. The reaction product of a chlorinated benzene-insoluble copolymer containing in chemically combined form 0.5 to 40 parts by weight of divinylbenzene and from 99.5 to 60 parts of ar-methylstyrene, which chlorinated copolymer contains substantial nuclear chlorination and has a reactive chlorine atom substituted for a hydrogen atom in each of at least a portion of the methyl radicals, with ethylenediamine in amount such that substantially each reactive substituent chlorine atom attached to carbon of a methyl radical in the chlorinated copolymer is replaced by a nitrogen atom of the ethylenediamine.

14. The reaction product of a chlorinated benzene-insoluble copolymer containing in chemically combined form from 0.5 to 40 parts by weight of divinylbenzene and from 99.5 to 60 parts of ar-dimethylstyrene, which chlorinated copolymer contains substantial nuclear chlorination and has a reactive chlorine atom substituted for a hydrogen atom in each of at least a portion of the methyl radicals, with ammonia in amount such that substantially each reactive substituent chlorine atom attached to carbon of a methyl radical in the chlorinated copolymer is replaced by a nitrogen atom of the ammonia.

15. The reaction product of a chlorinated benzene-insoluble copolymer containing in chemically combined form from 0.5 to 40 parts by weight of divinylbenzene and from 99.5 to 60 parts of methylstyrene, which chlorinated copolymer contains substantial nuclear chlorination and has a reactive chlorine atom substituted for a hydrogen atom in each of at least a portion of the methyl radicals, with ammonia in amount such that substantially each reactive substituent chlorine atom attached to carbon of a methyl radical in the chlorinated copolymer is replaced by a nitrogen atom of the ammonia.

16. The reaction product of a chlorinated benzene-insoluble copolymer containing in chemically combined form from 0.5 to 40 parts by weight of divinylbenzene and from 99.5 to 60 parts of ar-dimethylstyrene, which chlorinated copolymer contains substantial nuclear chlorination and has a reactive chlorine atom substituted for a hydrogen atom in each of at least a portion of the methyl radicals, with diethylamine in amount such that substantially each reactive substituent chlorine atom attached to carbon of a methyl radical in the chlorinated copolymer is replaced by a nitrogen atom of the diethylamine.

ELMER L. McMASTER.
ROBERT M. WHEATON.
JAMES RUSSELL SKIDMORE.

REFERENCES CITED

The following references are of record in the file of this patent:

UNITED STATES PATENTS

| Number | Name | Date |
|---|---|---|
| 2,304,637 | Hardy | Dec. 8, 1942 |
| 2,366,008 | D'Alelio | Dec. 26, 1944 |
| 2,409,861 | Hunter | Oct. 22, 1946 |
| 2,591,574 | McBurney | Apr. 1, 1952 |